United States Patent [19]

Bagnall-Wild et al.

[11] Patent Number: 4,613,898
[45] Date of Patent: Sep. 23, 1986

[54] IMAGING SYSTEMS

[75] Inventors: Ralph H. Bagnall-Wild, Traigh-Na-Mara; Herbert M. Runciman, Glasgow, both of Scotland

[73] Assignee: Barr & Stroud Limited, Glasgow, Scotland

[21] Appl. No.: 602,065

[22] Filed: Apr. 17, 1984

[30] Foreign Application Priority Data

May 16, 1983 [GB] United Kingdom ................ 8313383

[51] Int. Cl.⁴ .......................... H04N 7/18; H04N 3/20
[52] U.S. Cl. ...................... 358/87; 358/108; 358/113
[58] Field of Search ................ 358/87, 108, 113, 93

[56] References Cited

U.S. PATENT DOCUMENTS

| | | | |
|---|---|---|---|
| 3,542,948 | 11/1970 | Wolff | 358/87 |
| 3,872,238 | 3/1975 | Herndon | 358/87 |
| 4,153,917 | 5/1979 | Catano | 358/87 |
| 4,191,967 | 3/1980 | Dansal | 358/113 |
| 4,355,328 | 10/1982 | Kulik | 358/87 |

Primary Examiner—Howard W. Britton
Attorney, Agent, or Firm—Mason, Fenwick & Lawrence

[57] ABSTRACT

An imaging system (10) comprises an imaging data-collection station (11) having a camera (15) with a field of view (16) mounted on platform (13) rotatable about azimuthal axis (14). Collected image data is delivered on line (20) to a monitoring station (12) together with data on line (19) representative of the angular position of platform (13) which is sensed by sensor (18). The monitoring station (12) incorporates at least one channel each channel having a display device (25) having a known display field (30, $\alpha_1$), an operator-actuable sensor (26) which selects a particular angular position ($\theta_1$), within the wide angle field (17) traversed by fixed field of view (16), a gate device (28) for capturing the pertaining image data from line (20) and a store (29) for storing captured data.

6 Claims, 2 Drawing Figures

IMAGING SYSTEMS

This invention relates to imaging systems.

For security and other purposes there is frequently a requirement for a surveillance system which can be used to examine a wide angle field (often 360°). A problem which arises with such an arrangement is that the volume of image-data collected from the wide angle field when surveillance is undertaken for a lengthy time interval is so great as to cause major difficulty in interrogating the data.

It is an object of the present invention to provide an improved form of imaging system capable of undertaking surveillance of a wide angle field and which obviates or mitigates the above-mentioned disadvantage.

According to the present invention there is provided an imaging system comprising an image-data collection station and an image monitoring station, wherein said collection station comprises image-data collection means having a fixed field of view and means for effecting rotation of said field of view about an azimuthal axis whereby image data is continuously collected from a wide angle field, angle-sensing means associated with said rotation-effecting means for sensing instantaneous angular position of said fixed field of view within said wide angle field, image-data delivery means for continuously delivering collected image-data from said collection station to said monitoring station and angular-position-signal delivery means for continuously delivering said angular position signal from said collection station to said monitoring station, and wherein said monitoring station comprises a visual display monitor having a predetermined display field, an operator-actuable selector for selecting a particular angular position within said wide angle field and evaluating an associated range of angular positions within said wide angle field corresponding to said predetermined display field, data-capture means operable by said selector to capture repeatedly from the continuous delivery of image-data received by said monitoring station that image data from said associated range of angular positions, image-data store means connected to receive said captured data at each capture and to store captured data until the next data capture, the visual display monitor being connected to said store means to display the image data stored therein.

It will be appreciated that in the imaging system of the present invention whereas image-data is continuously collected in the collection station the monitoring station only captures a small portion of the data and it is this small portion of data which is displayed on the monitor, the display being repeatedly refreshed by each newly-captured data. Also, because the selector is operator-actuable the image which is displayed on the monitor may be varied in position from time to time in accordance with the operator's wishes so that surveillance of different portions of the wide angle field is possible. Also, the monitor may incorporate a frame comparator to effect data comparison on a frame by frame basis and to provide an alarm signal to an operator in the event that the comparison indicates lack of identity between two frames. The wide angle field may be 360° wide and the rotation-effecting means may provide continuous unidirectional rotation or uninterrupted bidirectional rotation.

The image-data collection means may operate in the visual or infrared waveband and may comprise a suitable camera (visual or infrared radiation sensitive) mounted on a rotatable platform. Alternatively the camera may be fixedly mounted and its fixed field of view rotated by optical means such as by a rotating reflector—for example a mirror or prism with a complementary image de-rotator prior to the camera. The fixed field of the camera preferably is elongate in the direction of the axis of rotation thereof and may in its simplest format simply be in the form of a line so that image data is collected from the line as it continuously passes around the wide angle field. The camera's fixed field is non-rotating.

The pointing direction of the camera may be orthogonal to the axis of rotation of the field of view or it may be elevated or depressed with respect to orthogonal.

In the monitoring station there may be a plurality of channels each provided with a visual display monitor, selector, data-capture means, and image-data store means arranged as previously described so that a plurality of operators may simultaneously monitor different (or duplicated) portions of the wide angle field. In this connection it will be appreciated that the data-capture means preferably does not extract the captured image data from the continuous delivery of image data but simply replicates the captured data so that the entirety of the continuous delivery of image data is available to each channel.

An embodiment of the present invention will now be described by way of example with reference to the accompanying drawing in which.

Figure 1:
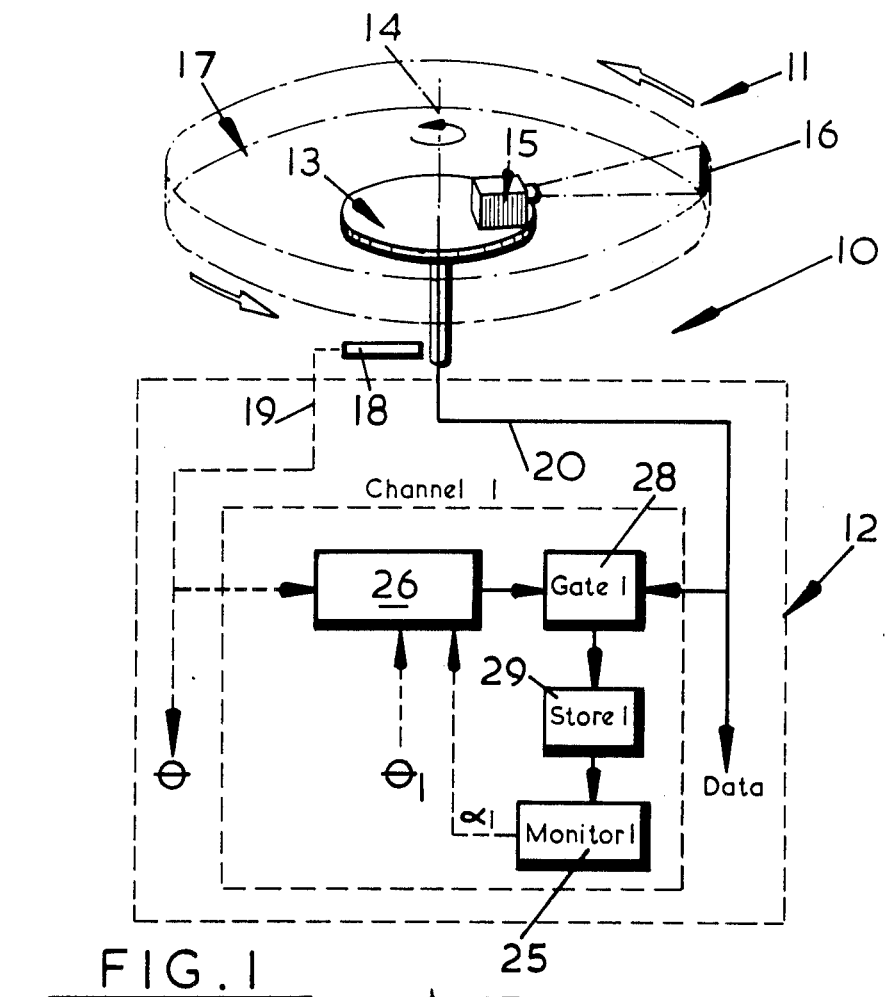
FIG. 1 illustrates an imaging system according to the present invention.

In the drawing an imaging system 10 comprises an image-data collection station 11 and an image monitoring station 12. Station 11 comprises a platform 13 which is rotatable in azimuth about an axis 14 and which carries an image-data collection means 15 having a fixed field of view in the form of a line 16 parallel with axis 14. Platform 13 is continuously rotated by a drive (not shown) at a rate which is known (for example 2 revolutions/second), and accordingly line 16 moves in a circular locus and traverses a 360° wide field 17. The angular position of the platform 13 is sensed by a sensor 18 which may be in the form or a synchro and an angle-position signal is delivered from the sensor 18 along lead 19 to station 12 whilst image-data is continuously delivered along lead 20 to station 12.

Figure 2:
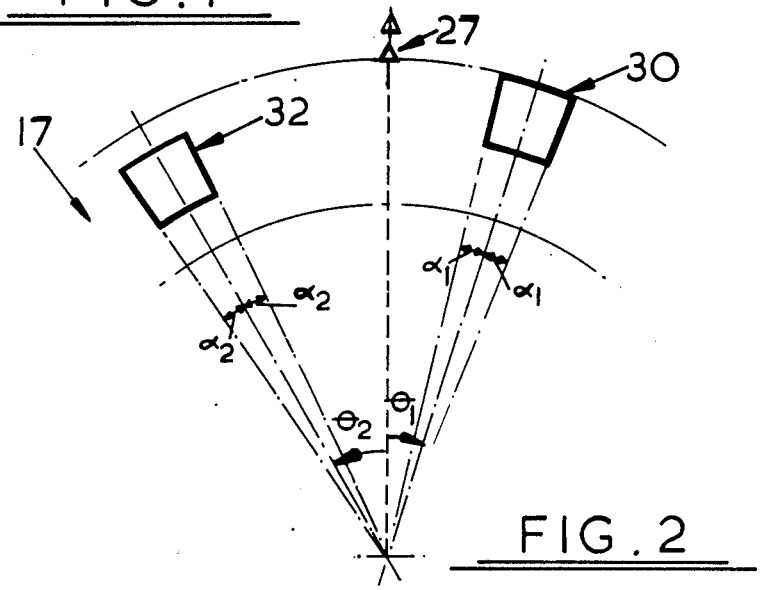
FIG. 2 is a diagram showing part of the 360° field and which is helpful in understanding operation of the imaging system of FIG. 1.

Monitoring station 12 comprises a plurality of channels 1,2,3, etc. of which only channel 1 is shown in the interests of clarity but it is to be understood that the other channels are similar. Channel 1 comprises a visual display monitor 25 having a predetermined display field the characteristics of which are therefore known and are represented by the parameter $a_1$. A manually-operable selector 26 functions to designate an angle $\theta$, relative to a datum direction 27 (see FIG. 2) from which the operator wishes an image to be displayed on monitor 25, $\theta_1$ denoting a particular location within the 360° field 17. Selector 26 functions to combine parameters $\theta_1$ and $a_1$ to determine a range of angular positions namely from $(\theta_1 - a_1)$ to $(\theta_1 + a_1)$ which range is applied to a gate device 28 in order to capture the corresponding portion of image data from lead 20, the captured data being delivered to a data store 29 the output of which supplies the image data to be displayed on the monitor 25. Accordingly the field 30 displayed on the monitor 25 represents a portion of the field 17 located at a position denoted by the parameter $\theta_1$ and determined in its angular extent by the parameter $\alpha_1$ It will be understood that a second channel, for example channel 2 may simultaneously display a field 32 located at $\theta_2$ and of extent $\alpha_2$ as shown in FIG. 2.

The camera 15 may take any one of a number of configurations. For example it may comprise one or more radiation-detection elements and a line scanner providing a vertical line scan of about 30°. Alternatively it may comprise an array of detector elements arranged in a plurality of lines thereby providing a plurality of simultaneous outputs each representative of one line in which case the revolution rate of the field of view and the vertical line scan rates are co-ordinated to provide for contiguity of the image-data over the 360° field. The image data for example may be fed into a CCD having radiation sensitive stores so that successive items of image-data provided by the passage of successive detector lines over a fixed line within the 360° field effects signal integration.

The data store 29 may also take a variety of configurations and in particular may be of the type wherein the data is clocked out to the monitor 25 at TV raster scan compatible rate irrespective of the data clocking in rate which is determined by the characteristics of the camera 15 and the revolution rate of the line 16 along the field 17,—i.e. scan converted.

The displayed field as viewed in the monitor 25 may be less than that of the scanned field in vertical extent by signal processing at the store 29 so that for example picture height is only half that of the scanned image height by display of only every second item of image data along the line 16. Furthermore the store 29 may be arranged to store more items of data than the monitor 25 is capable of displaying selection of the data items to be displayed being governed by pitch, roll and yaw sensory signals derived from the support on which the camera 15 is mounted in order to provide for picture stabilisation.

The camera 15 may alternatively comprise a frame transfer CCD having a radiation-sensitive image area on which radiation is incident for one field period to build up charge at the pertaining photosites. During the field blanking period of the monitor 25 when operating with a TV raster format the charge is transferred in the CCD from the image area to the non-radiation sensitive store area and during the following field period that stored data is clocked out at line frequency to an output register during line blanking, fresh data being collected in the image area. In this arrangement the clocking of data through the image area of the CCD and the store area of the CCD is effected at the same rate as the image (as distinct from the image data) is being moved across the image area so that integration of line information is effected by a factor of N where N is the number of lines contained in the CCD image area.

What is claimed is:

1. An imaging system comprising an image-data collection station and an image monitoring station, wherein said collection station comprises image-data collection means having a fixed field of view and means for effecting rotation of said field of view about an azimuthal axis whereby image data is continuously collected from a wide angle field, angle-sensing means associated with said rotation-effecting means for sensing instantaneous angular position of said fixed field of view within said wide angle field, image-data delivery means for continuously delivering collected image-data from said collection station to said monitoring station and angular-position-signal delivery means for continuously delivering said angular position signal from said collection station to said monitoring station, and wherein said monitoring station comprises a visual display monitor having a predetermined display field, an operator-actuable selector for selecting a particular angular position within said wide angle field and evaluating an associated range of angular positions within said wide angle field corresponding to said predetermined display field, data-capture means operable by said selector to capture repeatedly from the continuous delivery of image-data received by said monitoring station that image data from said associated range of angular positions, image-data store means connected to receive said captured data at each capture and to store captured data until the next data capture, the visual display monitor being connected to said store means to display the image data stored therein.

2. An imaging system as claimed in claim 1, wherein the monitoring station comprises a plurality of channels each having a visual display monitor, selector, data capture means, and image-data store means whereby a plurality of operators can simultaneously monitor portions of the wide angle field.

3. An imaging system as claimed in claim 1, claim, wherein the wide angle field is 360° wide and the rotation effecting means provides continuous unidirectional rotation.

4. An imaging system as claimed in claim 1, wherein the image-data collection means operates in the visual waveband.

5. An imaging system as claimed in claim 1, wherein the image-data collection means operates in the infrared waveband.

6. An imaging system as claimed in claim 1, wherein said fixed field of view is elongate in the direction of the axis of rotation.

* * * * *